March 24, 1931.                O. FOX ET AL                    1,797,571
                  THERMOSTATIC CONTROL SYSTEM FOR BOILERS
                  Filed Dec. 31, 1926        3 Sheets-Sheet 2

Fig. 2.

Inventors.
Otto Fox and
Willet E. Stark.
Kwis Hudson & Kent, Attys.

March 24, 1931. O. FOX ET AL 1,797,571
THERMOSTATIC CONTROL SYSTEM FOR BOILERS
Filed Dec. 31, 1926    3 Sheets-Sheet 3

Patented Mar. 24, 1931

1,797,571

UNITED STATES PATENT OFFICE

OTTO FOX, OF CLEVELAND, AND WILLET E. STARK, OF EAST CLEVELAND, OHIO, ASSIGNORS TO THE BRYANT HEATER AND MANUFACTURING COMPANY, OF CLEVELAND, OHIO, A CORPORATION OF OHIO

THERMOSTATIC CONTROL SYSTEM FOR BOILERS

Application filed December 31, 1926. Serial No. 158,182.

This invention relates to a boiler control system, the primary object being to automatically regulate the flow of gas to the burners which heat the water contained in a boiler producing steam for heating purposes.

One object of the invention is to control the steam pressure within the boiler in such a manner that when the steam reaches a predetermined maximum pressure the flow of gas to the burners is automatically cut off, thereby discontinuing the heating of the water in the boiler, and, further, when the steam pressure falls off to a minimum, the flow of gas to the burners is automatically turned on thereby heating the water within the boiler to generate more steam.

A further object of the invention resides in including in the system, a means for automatically regulating the temperature within a room by cutting off the flow of gas to the burners when the temperature within the room has reached a predetermined maximum degree so that no heat will be supplied to the boiler which, consequently, reduces the steam pressure within the boiler thereby effecting the cooling of the room. When the temperature reaches a predetermined minimum, the flow of gas will be automatically turned on so that the burners will again heat the water within the boiler thereby generating steam which subsequently raises the temperature of the room.

Another object of the invention is to include means whereby the flow of gas to the burners is cut off in case the water in the boiler should fall below a predetermined level; thus preventing damage to the boiler and to the surroundings through overheating. The means whereby this object is accomplished also includes a feature through which the gas is again permitted to flow to the burners when the water in the boiler has been restored to the proper level.

Since gas burning boilers are often used under such conditions that a continuous or intermittent replenishment of the water in the boiler becomes necessary, means is provided whereby there may be incorporated in the invention a device that will replenish the supply of water in the boiler at such a rate that a practically constant level will be maintained, regardless of variations in the rate at which the water in the boiler is being driven off in the form of steam.

A final object of the invention is to provide in a unitary system, a gas regulating means which will be automatically operated to regulate the flow of gas to the main burners with an increase or decrease in steam pressure above or below a predetermined amount, a fall or rise of water in the boiler below or up to a predetermined level, and an increase or decrease in temperature above or below a predetermined degree, together with means for admitting water to the boiler in varying amounts in order to maintain a practically constant level therein.

With the above objects indicated and other objects hereinafter explained, in view, our invention consists in the construction and combination of elements hereinafter described and claimed.

Referring to the drawings:

Fig. 2 is a vertical cross sectional view of the main casting showing the respective locations of the float chamber and the bellows chamber with the respective mechanisms disposed therein.

Fig. 4 is an enlarged detail sectional view of the pressure valve employed in the system for supply fresh water to the boiler.

Figure 1:
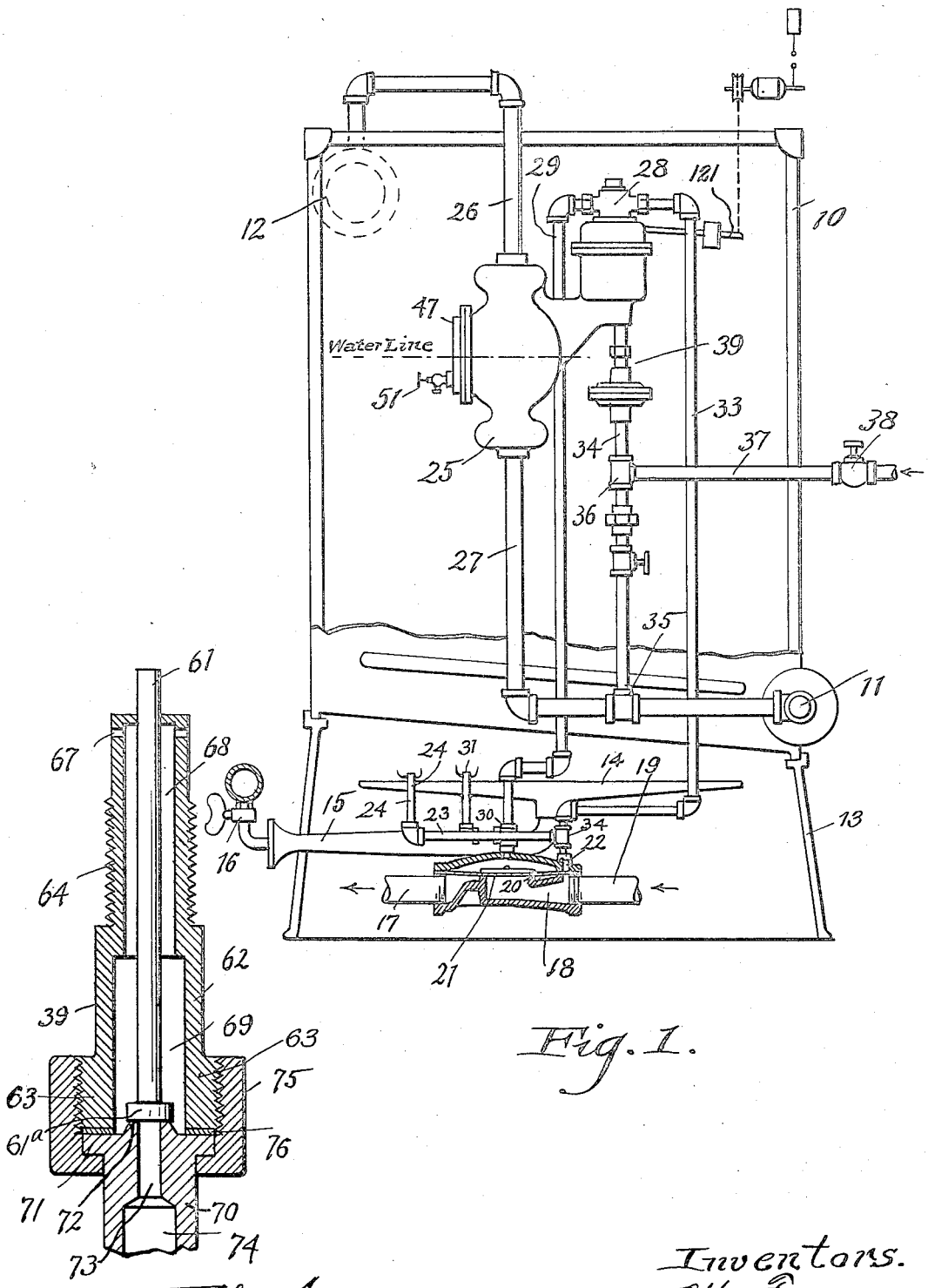
Fig. 1 is a schematic view of our boiler control system showing the relative position thereof with respect to a boiler.
Figure 3:
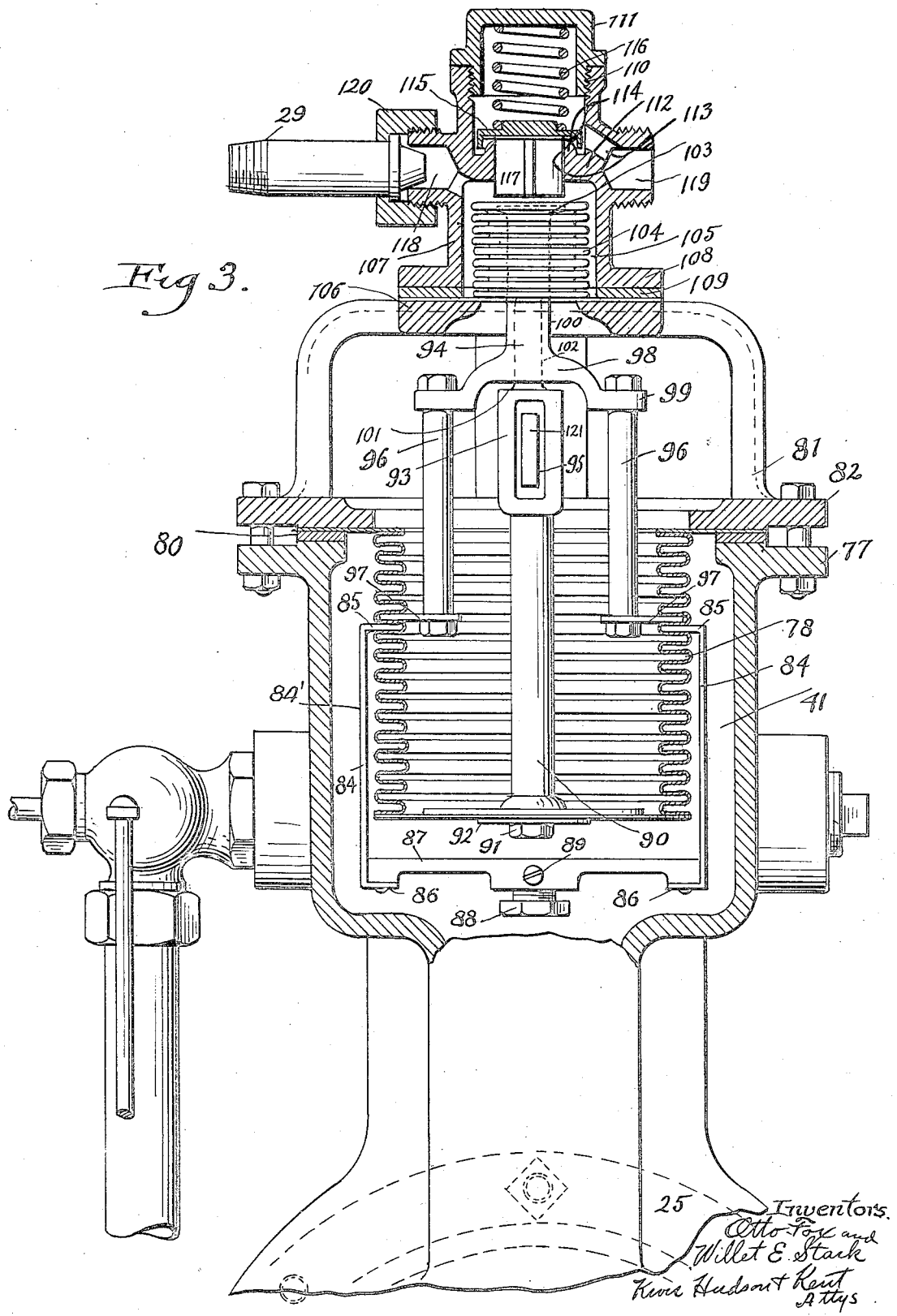
Fig. 3 is an enlarged vertical cross sectional view of the bellows chamber taken on the vertical central line of the bellows chamber in Fig. 2 but at right angles thereto.

In the drawings, 10 indicates a boiler of the usual construction having an inlet 11 and an outlet 12 disposed at diagonally opposite corners thereof. The boiler 10 is supported on the cast iron base 13, the under surfaces of the boiler sections being exposed within the base 13. The desired number of burners 14 are supported beneath the boiler sections and are connected to a corresponding number of mixers 15, one end of which extends through to the outside of base 13. The ends of the mixers 15 are provided with individual hand operated valves 16 while the opposite end of the valves are connected to a gas pipe 17. A diaphragm valve chamber 18 is employed, the valve chamber being provided with two oppositely disposed screw-threaded openings, one of which is adapted to receive the end of the pipe 17. The opposite opening of the valve chamber 18 is screw-threaded and receives the inlet pipe 19 which is connected to the main line gas supply which supplies gas to the burners 14. The valve chamber 18 is provided with an inner valve seat 20 and disposed above the valve seat 20 is a diaphragm 21 having its periphery secured to the valve chamber 18 and which divides the valve chamber into substantially an upper and lower chamber, and a portion of the diaphragm is adapted to rest upon the valve seat 20 to close the same. An opening 22 is provided in the upper portion of the valve chamber 18 to which is connected a pipe 23 having the opposite end connected to a pilot burner 24 adapted to light the burners 14 when the gas is supplied thereto.

What we will term a main casting 25 is positioned, as indicated in Fig. 1, upon the side of the boiler near the top thereof and consists of a float chamber 40 and a bellows chamber 41 the construction of which will be hereinafter described more fully. This main casting 25 is positioned upon the side of the boiler 10 so that the horizontal center of the float chamber 40 is substantially at the same level as the normal water line within the boiler. The casting 25 is provided with an opening 44 at its upper end to which is connected a pipe 26 having its opposite end connected to the outlet 12 of the boiler 10. A screw-threaded opening 43 is disposed at the lower portion of the casting 25 diametrically opposite to the aforementioned opening 44 and receives one end of the pipe 27, the opposite end being connected to the inlet 11 of the boiler 10. This arrangement affords what might be termed an open system between the boiler and chamber so that the height of the water within the chamber 25 is always at the same level as the water in the boiler 10.

Disposed above the bellows chamber 105 and an integral part of the same casting is a valve chamber indicated generally as 28 which is provided with opposite disposed openings, one of said openings 119 being an inlet and the other opening 118 being an outlet. The pipe 29 has one end connected to the discharge opening 118 while its opposite end is connected to an opening in the upper portion of the valve chamber 18 directly above the diaphragm 21. A T-joint 30 is disposed within the pipe 29 and is connected to a pilot burner 31 by means of suitable piping. This pilot 31 functions as a pressure relief for the gas in the upper portion of the valve chamber 18 above the diaphragm 21 and for the gas within the pipe 29, the purpose of which will hereafter be more fully described. A pipe 33 has one end connected to the inlet opening 119 of the valve 28 while its opposite end is connected to a T-joint 34 disposed between the pipe 23 and the outlet opening 22, which outlet opening communicates with the main gas supply below the diaphragm of the valve chamber 18.

A screw-threaded opening 65 is provided at the lower end of the bellows chamber 41 and receives one end of the pipe line 34, the opposite end being screw-threaded into a T-joint 35 disposed within the pipe line 27 leading from the main casting 25 to the inlet 11 of the boiler 10. At substantially a mid-point of the pipe line 34 there is a T-joint 36 into which is threaded a pipe 37 leading to a fresh water supply under pressure, the flow of the water being controlled by means of a valve 38. This water is fed to the boiler whenever the water falls below a certain level.

Disposed within the pipe 34 above the T-joint 36 is a pressure valve 39 for regulating the admission of fresh water into the boiler from the fresh water supply line which is automatically operated in the manner to be later described.

Describing now the construction of the main casting 25, clearly illustrated in Fig. 2, it might be said that the casting is divided into two chambers, a so-called float chamber 40 formed at the lower portion of the main casting 25 and a bellows chamber 41 formed in the upper portion of the main casting and to the right of the float chamber 40. These two chambers are connected together by a passageway 42, the object of which is to permit steam formed in the upper part of the float chamber 40 to pass over into the bellows chamber 41 and also to provide room for the working of lever 55, the purpose of which is hereafter described. A screw-threaded opening 43 is provided in the lower portion of the float chamber 40 and receives therein the screw-threaded end of the pipe 27 which leads to the lower part of the boiler or inlet 11. Another screw-threaded opening 44, disposed axially opposite from the opening 43, is provided in the upper portion of the float chamber and receives the screw-threaded end of the pipe 26 therein, which pipe, as has heretofore been described, leads to the upper part of the boiler and is connected to the outlet 12. The outer side of the float chamber 40 has an opening 45 around which extends an annular flange 46, the opening serving as a means for inspecting the interior of the float chamber and for assembling the mechanism. The opening 45 is normally closed by a cover 47 having an outer annular flange 48 aligning with the flange 46 of the float chamber 40. A packing member 49 is interposed between the flanged portions of the float chamber 40 and the cover plate 47 and is secured in position by means of bolts extending through the flanges 46 and 48 spaced suitably apart around the outer portion of the flanges. The cover plate 47 is provided with a pipe tap 50 which receives the threaded end of a gage cock 51. The upper portion of the float chamber 40, above the cover plate 47, is provided with a pipe tap 52 which receives the threaded end of a gage cock 53. The float chamber is of sufficient size to receive and permit vertical movement of a float 54. The position of this float 54 within the float chamber 40 is determined by the level of the water contained within the float chamber which corresponds with the level of the water within the boiler. A lever 55 is pivoted, by means of a pin 56, within the bellows chamber 41 and extends rearwardly through the passageway 42 to substantially the vertical center of the float chamber 40 and terminates in a bifurcated end portion 57. To the upper portion of the float 54 is secured a rod 58 having its free end formed with a portion adapted to fit within the bifurcated end 57 of the lever 55 and is pivotally attached thereto by means of a pin 59. The lever 55 is maintained in substantially a horizontal position as indicated in full lines in Fig. 2 when the water within the float chamber 40 is at its normal level. When, however, the water falls below its normal level the float falls toward the position indicated in dotted lines in Fig. 2. The free end of the lever 55 terminates in an extension 60 which overlaps to some extent the vertical center of the bellows chamber 41. This extension 60 when in its normal position bears on the end of the valve stem 61 of the pressure valve 39 controlling the fresh water supply for replenishing the boiler.

The valve 39 comprises a body portion 62 which is enlarged and screw-threaded at its lower end 63. The body of the valve 39 is further provided with screw-threads 64 which engage with a screw-threaded opening 65 formed in the lower portion of the bellows chamber 41 at substantially its central point. The valve is locked in place within the opening by means of a lock nut 66 which permits the valve to be adjusted. The body 62 of the valve has a series of openings 67 at its upper end which extend through the body into a passage 68, which passage communicates with an enlarged passage 69 formed at the lower end of the valve body 62. The lower member 70 of the valve body has an annular flange 71 at its upper end and a valve seat 72 is formed upon the upper surface centrally thereof, the valve seat being adapted to extend within the passage 69 and to receive the valve 61ª. This lower portion 70 is provided with an opening 73 which extends centrally through the valve seat and communicates with an enlarged opening 74 leading to the pipe 34 connected to the fresh water supply. The body member 62 of the valve 39 and the lower member 70 are secured together by means of a union nut 75, a packing 76 being interposed between the members to afford a water tight joint.

The upper end of the bellows chamber 41 is open and is provided with an annular flange 77 surrounding the opening. Extending downwardly within the bellows chamber 41 is a bellows 78 closed at its lower end but open at the upper end and extending annularly around the opening is an outwardly extending flange 79 formed integral with the bellows or secured in some suitable steam tight manner. This flange 79 extends outwardly a sufficient distance resting upon a packing member 80 positioned upon the flange 77, and a hooded cover 81 having an annular flange 82 rests upon the flange 79 and the packing 80 and securely maintains these members in position by means of bolts extending through the flanges 82 and 77, at the same time affording a steam tight joint. This hooded cover 81 has a central opening 83 of substantially a diameter equal to the outer diameter of the bellows 78. A pair of side strips 84 form part of a depending yoke 84' and have their upper ends 85 bent inwardly into engagement with a portion of the bellows 78. The side portions 84 extend downwardly and outside of the bellows and have their lower ends 86 bent inwardly and secured by means of screws or bolts to a cross bar 87 which extends beneath the bellows 78. At mid-point of the bar 87 is a central screw-threaded opening which receives an adjustable bolt 88, the head of which extends downwardly and is adapted to be engaged by the extension 60 of the lever 55. The bolt is secured in the desired position by means of a set screw 89.

Extending centrally within the bellows 78 is a rod 90 secured at its lower end to the bottom of the bellows by means of a bolt 91 which has disposed between the head and the bottom of the bellows an enlarged washer 92 which acts as a reenforcement for the bottom of the bellows. The end of this rod 90 extends beyond the open end of the bellows 78 and is provided with an enlarged portion 93 and a reduced cylindrical portion 94 directly above. A slot or opening 95 extends transversely through the enlarged portion 93 and centrally thereof.

A pair of rods 96 have secured to their lower ends by bolts, plates 97 extending at right angles therefrom, the outer ends of the plates 97 engaging and being secured in place within one of the folds on the inside of the bellows 78 at a point above the ends 85 of the yoke. The upper ends of the rods 96 support a yoke 98, through the medium of extensions 99, which extensions are secured to the rods 96 by bolts. The yoke 98 is provided with a hollow portion 100 which fits loosely around the cylindrical portion 94, which arrangement permits the yoke 98 to be moved upwardly without affecting the rod 90 or the lower portion of the bellows 78.

The hollow portion 100 of the yoke 98 terminates directly below the closed end of a small bellows 104 expansibly secured within a small bellows chamber 105 in a valve casing 107. The open end of the bellows 104 extends downwardly and is provided with an annular flange 106 which rests centrally upon the upper portion of the cover 81. This cover 81 has a central opening of substantially the same diameter as the diameter of the bellows 104 so as to permit free communication between the interior of the bellows 104 and the interior of the bellows 78 which is exposed to the atmosphere. This valve casing 107 is provided at its lower end with an annular flange 108 and rests upon a packing 109 positioned upon the upper surface of the flange 106 and is secured to the upper portion of the cover 81 by bolts or any other suitable means thus preventing any gas within the upper portion of the valve from leaking around the bellows 104. The upper portion of the valve casing 107 has a screw-threaded opening 110 which receives the screw-threaded end of a plug 111 securely closing the opening. A wall 112 extends transversely within the valve casing 107 between the opening 110 and the bellows chamber 105 and is provided with a central opening 113, around the upper portion of which is a valve seat 114. A valve 115 engages the valve seat 114 and is normally held in engagement therewith by the spring 116 which has one end engaging a portion of the valve 115 and the opposite end resting upon the inner surface of the plug 111. The valve 115 is provided with a downwardly extending portion 117 adapted to fit within the central opening 113 formed within the transverse wall 112. This extension 117 is constructed so as to permit the free passage of gas from the opening 119 over the valve seat 114 and to the opening 118, and extends downwardly a distance substantially engaging the closed end of the bellows 104 when in normal position. The opening 118 which is the discharge opening for the gas flow is connected to the pipe 29, which leads to the upper portion of the diaphragm valve 18, by means of a union 120. The opening 119 which is the inlet opening is connected to the pipe 33, leading to the portion of the diaphragm valve chamber 18 below the diaphragm 21 and communicates directly with the main gas supply line.

A lever 121 extends through a slotted opening in the cover 81 and through the slot 95 in the head 93 and is pivotally attached thereto by a pin 122. The end within the cover 81 is pivoted to a link 123 which link in turn is pivoted to a fin 124 integral with the upper inner portion of the cover 81. This lever is mounted for vertical movement within the slot in the casing 81 and its limit of movement is controlled by means of an adjustable bolt 125 engaging the upper edge of the lever 121 and extending through the upper portion of the cover 81. The adjusting bolt 125 may be secured in the desired position by any suitable means, the means herein shown being a nut 126. The extended end of the lever 121 is connected by a cable or other suitable means to a motor adapted to raise and lower the lever, the motor being controlled by a temperature responsive device or thermostatic control device located within a room. This arrangement is for the purpose of automatically controlling the temperature within the room.

It is to be understood for the efficient operation of the system that the main casting 25 is placed on the outside of the boiler 10 so that the horizontal center of the float chamber 40 corresponds to the normal water level within the boiler.

Assuming now that the water within the float chamber 40, and likewise within the boiler 10, drops below the normal water level, the float 54 would drop to the position shown by dotted lines in Fig. 2. This would cause the extension 60 of the lever 55 to release the valve 61$^a$ of the pressure valve 39 and allow the water in the fresh water supply line, which is always held under pressure, to escape through the openings 67 in the valve and into the float chamber 40 which is directly connected with the boiler so that the boiler is eventually refilled.

Assume further that for any reason whatsoever, such as failure of the water pressure or sticking of the valve member 61$^a$, the dropping of the float 54 fails to cause the replenishment of the water in the boiler. Any further dropping of the float beyond that necessary to permit valve member 61$^a$ to raise will cause the end 60 of lever 55 to press upwardly on adjustment screw 88, thus tending to raise cross bar 87, together with members 84. The consequent elongation of the lower part of bellows 78 and the compression of the upper part will cause the upward movement of bar 87 and members 84 to be transferred through rods 96 to yoke 98 with its hollow portion 100. The upper end of hollow portion 100 will thus be caused to bear on the closed end of bellows 104, tending to elongate it and to move this closed end upwardly. This closed end will thus strike extended portion 117 of valve 115 lifting it off its seat 114 and permitting gas to flow through opening 119 from pipe 33 and thence through opening 118 to pipe 29. Since pipe 33 is in communication with the lower chamber of diaphragm valve 18, and since pipe 29 is in communication with the upper chamber of said valve, the raising of valve 115 causes the gas pressures above and below diaphragm 21 to be equalized, thus causing it to become seated on valve seat 20 due to its own weight. The diaphragm valve 18 being closed cuts off the main gas supply to the burners 14 and holds it off until the boiler and float chamber are replenished with fresh water.

When, through any agency whatsoever, the water in the boiler and in float chamber 40 is brought back to its normal level, float 54 will be raised to the position shown in full lines. This will cause the end 60 of lever 55 to cease bearing upon adjustment screw 88 and to eventually disengage itself from said screw. The elasticity of bellows 78 will cause it to assume its normal position, thus causing the upper end of hollow portion 100 to cease bearing against the closed end of bellows 104. The elasticity of bellows 104 will in turn cause it to cease bearing against the extended portion 117 of valve 115. Valve 115 will then be brought firmly in contact with seat 114 through the downward pressure of spring 116, thereby cutting off the communication that had been established between the lower and upper chambers of diaphragm valve 18, through pipes 33 and 29. The pressure of gas accumulated in the upper chamber of diaphragm valve 18 will relieve itself through pipe 32 and escapement burner 31, thereby reducing the pressure on the upper side of diaphragm 21 to atmospheric. The preponderant gas pressure on the lower side of diaphragm 21 will raise the diaphragm permitting gas to flow from inlet 19, over seat 20, to outlet 17 and to burners 14.

The replenishment of the water in the boiler and in float chamber 40 further causes end 60 of lever 55 to bear down on valve stem 61 of valve 61ª; due to the tendency of the water in the float chamber to raise float 54. Valve 61ª is thus brought firmly in contact with seat 72, thereby preventing the admission of any further fresh water from pipe 37 until the float 54 again drops due to subsequent dropping of the water level in float chamber 40 from any cause whatsoever. The features, apparatus, and action just described, discloses the operating of the system when the water within the boiler falls below the normal water line and when it is subsequently brought back to the normal water line.

The operation of the system is also brought about by variations of the steam pressure within the boiler in the following manner.

Assume that through the application of heat to the boiler, steam is produced therein and that the pressure of this steam is communicated through outlet 12, pipe 26 and passageway 42 to the interior of bellows chamber 41. If the exit of the steam from the boiler is restricted in any manner whatsoever, such as by the friction in a steam heating system, a pressure will be produced within the boiler, which pressure will be exerted in equal amount on the bellows 78. Since the inner part of bellows 78 is exposed to atmospheric pressure, the excess of pressure beneath the bellows will tend to compress it, thus tending to move rod 90 in an upward direction. Since rod 90 is attached to lever 121 by means of pin 122, any upward motion of rod 90 must, of necessity, cause lever 121 to tend to rotate in a counterclockwise direction about the pin in the lower end of link 123. If, now, a movable weight is placed upon lever 121 it offers a resistance to the upward movement of rod 90, which resistance will be varied by moving the weight on the lever. When the steam pressure has accumulated around bellows 78 in sufficient amount to overcome the resistance of the movable weight on lever 121, the bellows will be compressed, thus moving rod 90 and large portion 93 and reduced cylindrical portion 94 in an upward direction. This action lifts valve 115 from its seat 114 and causes the diaphragm valve 18 to be closed in the same manner as has been heretofore described thus cutting off the flow of gas to the main burners: When the steam pressure within the boiler is reduced below an amount necessary to overcome the resistance of the weight on lever 121, due to the supply of heat to the boiler having been cut off, valve 115 will again be seated on seat 114 by spring 116 through the downward motion of rod 90 caused by the weight on lever 121. Thus the flow of gas to the upper chamber of diaphragm valve 18 is stopped and gas pressure therein is relieved through pipe 32 and escapement burner 31. Diaphragm 21 is lifted from valve seat 20 and the main flow of gas is again permitted to pass through to the burners where it is ignited and serves to further heat the water within the boiler to generate steam.

Assuming now that the room temperature is to be regulated by means of the system already described, a temperature responsive device, or a thermostatic control device, is placed within the room and set for operation between certain degrees, this thermostatic control device being connected to a suitable motor which in turn is connected by means of a cable to the lever 121. When the heat within the room is raised to the maximum set on the thermostatic control device it causes the motor to operate which lifts up the lever 121 thus raising the rod 90 through the medium of pin 122 passing through enlarged portion 93 and lever 121. This causes the displacement of the valve 115 from its valve seat 114, permitting a free flow of the gas between the pipe line 33 and the pipe line 29 causing the diaphragm 21 to be seated; thereby cutting off the flow of the gas to the main burners in a fashion heretofore described. When the temperature of the room drops to a predetermined minimum, the thermostatic control device causes the motor to operate in the opposite direction which lowers the lever 121, and the valve 115 is again seated by the spring 116. This closes the flow of gas between the pipe 33 and the pipe 29 and the pressure of the gas from the main line lifts the diaphragm 21 from its seat 20 and permits the gas to flow through to the main burners.

It will be readily seen from the foregoing description of the operation of the system that each of these features, namely, the float and water valve responsive to water level, the steam pressure control, and the room temperature control, function through a single controlling means which functions to automatically cut off the flow of gas to the main burners through a diaphragm valve. The apparatus is so constructed that the controlling means is operated independently by each of these features and the apparatus is so arranged that the controlling means will function if the controlling conditions stated, namely, water level, steam pressure, and room temperature all change at the same time, the controlling means acting to cut off the supply of gas to the burners until each of the conditions described are satisfied.

While we have described the preferred construction of the apparatus comprising our boiler control system it is understood that we are not to be limited to the specific apparatus herein specified but many changes may be made to the controlling means without departing from the spirit of the invention as contained in the appended claims.

Having thus described our invention, what we claim is:

1. In a boiler control system for controlling the flow of gas to the main burners, a diaphragm valve disposed in the main gas line leading to said burners, and a pressure controlling means, for actuating the diaphragm valve to thereby control the flow of gas to the main burners, said controlling means being actuated independently by a temperature responsive device, an increase of steam pressure within the boiler or a diminution of water within said boiler to thereby regulate the flow of gas to said burners.

2. In a boiler control system for controlling the flow of gas to the burners, a diaphragm valve disposed in the main gas line leading to the burners, a pressure controlling means communicating with the diaphragm valve, and a temperature responsive means associated with the controlling means the latter being also actuated by the steam pressure within the boiler and by a diminution of the water within said boiler below a predetermined level.

3. In a boiler control system for controlling the flow of gas to the burners, a diaphragm valve disposed in the main gas line leading to the burners, a pressure controlling means communicating with the diaphragm valve, and a temperature responsive device controlling the operation of the controlling means for opening and closing the diaphragm valve, said controlling means being also actuated by an increase in steam pressure within said boiler and also by failure of the water supply to said boiler when the water drops to a predetermined level.

4. In a boiler control system for controlling the flow of gas to the burners, a diaphragm valve disposed in the main gas line leading to the burners, a pressure controlling means communicating with the diaphragm valve, and a temperature responsive device controlling the operation of the controlling means, the controlling means causing the diaphragm valve to cut off the flow of gas to the burners at a certain high temperature, and vice versa at a certain low temperature, said valve means being also actuated by changes in steam pressure in said boiler and also by a change in the water level within the boiler.

5. In a boiler control system for controlling the flow of gas to the burners, a diaphragm valve disposed in the main gas line leading to the burners, a pressure controlling means communicating with the diaphragm valve, and a temperature regulated device actuating the controlling means, an increase of temperature causing the controlling means to close the diaphragm valve to shut off the flow of gas to the burners while a decrease of temperature acts vice versa, said controlling means being also subjected to the steam pressure within said boiler whereby said diaphragm valve is closed by an increased steam pressure, and caused to open with a decrease in steam pressure, and said controlling means being also actuated due to a diminution of water within said boiler below a predetermined level.

6. In a boiler control system for controlling the flow of gas to the burners, a diaphragm valve in the main gas line leading to the burners, a second valve, a gas line connected to the diaphragm valve above the diaphragm and to the second valve below the valve seat, a second gas line connected to the diaphragm valve below the diaphragm at the main gas inlet and to the second valve above the valve seat, a thermostatic control device, and means connected to the thermostatic control device and to the second valve for operating said valve upon the operation of said thermostatic control device for controlling the flow of gas to the burners, said second valve also being actuated by a change in steam pressure within said boiler and also actuated by a diminution of water below a predetermined level in said boiler.

7. In a boiler control system for controlling the flow of gas to the burners, a diaphragm valve in the main gas line leading to the burners, a pressure controlling means associated with the diaphragm valve including a bellows, said bellows being subjected to the steam pressure within said boiler and adapted to actuate the controlling means to close the diaphragm valve to cut off the flow of gas to the main burners when the steam pressure reaches a predetermined pressure and vice versa, when the steam pressure drops to a predetermined low point, said controlling means being also actuated through said bellows by a temperature responsive device and also by a drop in the level of water within said boiler.

8. In a boiler control system for controlling the flow of gas to the burners, a diaphragm valve in the main gas line leading to the burners, a second valve, a gas line connected to the diaphragm valve above the diaphragm and to said second valve below the valve seat, a second gas line connected to the diaphragm valve at the main gas inlet below the diaphragm and to said second valve above the valve seat, and means acted upon by the steam in the boiler for operating said second valve thereby controlling the flow of gas to the burners, said means being also acted upon by a temperature responsive device and also by a drop in the level of the water in said boiler to thereby control the flow of gas to the burners.

9. A boiler control system for controlling the steam pressure, the water level and the room temperature, comprising a diaphragm valve disposed in a main gas line leading to the burners, a fresh water supply means, a temperature responsive device, and a pressure controlling means operatively connected with the diaphragm valve adapted to operate the said valve to regulate the flow of gas to the burners upon a change in room temperature, steam pressure or water level, each acting independent of the other upon the controlling means for regulating the flow of gas to the burners through said pressure controlling means.

10. In a boiler control system for controlling the flow of fuel to the burners, the combination of a valve in the main fuel supply line, a second valve controlling the operation of the first mentioned valve, and means for actuating said second valve, said means comprising a temperature responsive device, a bellows, and a member movable into engagement with a portion of said second valve by a force transmitted through a portion of the length of said bellows in response to a change in water level within said boiler, by a change in the full length of said bellows in response to a change in boiler pressure, and by the action of said temperature responsive device.

11. In a boiler control system for controlling the flow of fuel to the burners, the combination of a valve in the main fuel supply line, a second valve controlling the operation of the first mentioned valve, and means for actuating said second valve, said means comprising an actuating member, a bellows, a water level control, a temperature responsive device, and relatively movable members operatively connecting said actuating member with end and intermediate portions respectively of said bellows and with said temperature responsive device whereby said actuating member is moved by a change in the full length of said bellows in response to a change in boiler pressure, by said water level control acting through a portion of the length of said bellows in response to a change in water level within said boiler, and by the action of said temperature responsive device.

12. In a boiler control system for controlling the flow of fuel to the burners, the combination of a valve in the main fuel supply line, a second valve controlling the operation of the first mentioned valve, an actuating member for said second valve, and means for moving said actuating member, said means comprising a bellows, means for transmitting motion to said actuating member through a portion of the length of said bellows in response to changes in water level within said boiler, a second member in engagement with said actuating member and moved by changes in the full length of said bellows in response to changes in boiler pressure, and a temperature control device operatively engaging said second member.

13. In a boiler control system for controlling the flow of fuel to the burners, the combination of a fluid actuated valve in the main fuel supply line, piping arranged to supply actuating fluid to said fluid actuated valve, a second valve connected in said piping for controlling the flow of actuating fluid therethrough, and means for actuating said second valve, said means comprising a movable member, a temperature responsive device, a bellows having its full length responsive to changes in boiler pressure, a water level responsive device, means operatively connecting said movable member with said water level responsive device through an intermediate portion of said bellows, and means engaging said movable member and having operative connections with an end portion of said bellows and with said temperature responsive device.

14. In a boiler control system for controlling the flow of gas to the main burners, a valve disposed in the main gas line leading to said burners, and a pressure controlling means for actuating said valve to thereby control the flow of gas to the main burners, said controlling means being actuated independently by a temperature responsive device, an increase in steam pressure within the boiler or a diminution of water within said boiler.

In testimony whereof, we hereunto affix our signatures.

OTTO FOX.
WILLET E. STARK.